Figure 1:
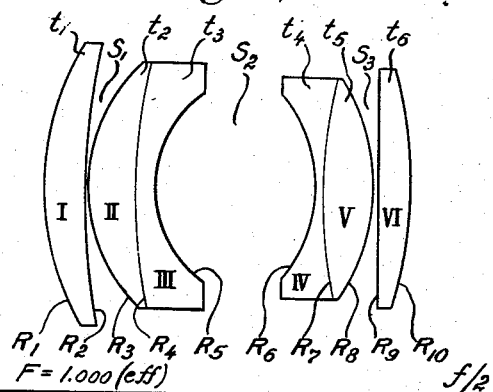

Dec. 5, 1950     J. G. BAKER     2,532,752
HIGHLY CORRECTED FOUR COMPONENT OBJECTIVE LENS
Filed Sept. 29, 1949

T2305

$F = 1.000$ (eff)   f/2

| LENS | RADII | THICKNESS | $N_D$ | $\nu$ |
|---|---|---|---|---|
| I | $R_1 = 0.536$ | $t_1 = 0.081$ | 1.657 | 51.2 |
|   | $R_2 = 1.324$ | $S_1 = 0.002$ |       |      |
| II | $R_3 = 0.324$ | $t_2 = 0.100$ | 1.657 | 51.2 |
| III | $R_4 = 1.295$ | $t_3 = 0.035$ | 1.649 | 33.8 |
|    | $R_5 = 0.217$ | $S_2 = 0.308$ |       |      |
| IV | $R_6 = -0.272$ | $t_4 = 0.018$ | 1.617 | 36.6 |
| V  | $R_7 = 1.079$ | $t_5 = 0.100$ | 1.657 | 51.2 |
|    | $R_8 = -0.341$ | $S_3 = 0.002$ |       |      |
| VI | $R_9 = 6.473$ | $t_6 = 0.064$ | 1.670 | 47.2 |
|    | $R_{10} = -0.806$ |           |       |      |

INVENTOR.
James G. Baker
BY Pennie Edmonds Morton Barrows
ATTORNEYS

Patented Dec. 5, 1950

2,532,752

UNITED STATES PATENT OFFICE 2,532,752

HIGHLY CORRECTED FOUR COMPONENT OBJECTIVE LENS

James G. Baker, Orinda, Calif., assignor to The Perkin-Elmer Corporation, Glenbrook, Conn., a corporation of New York Application September 29, 1949, Serial No. 118,628

8 Claims. (Cl. 88—57)

This invention relates to optical objectives for photographic projection and similar purposes and, more particularly, to that class of objectives, which contain a pair of meniscus components of net divergent effect lying between collective components, the meniscus components being concave to one another on opposite sides of a central stop.

In my co-pending application Serial No. 118,627 filed September 29, 1949, I disclose novel objectives of the class referred to, which are considerably better corrected than prior similar objectives with respect to oblique spherical aberration and astigmatism at field points far off the optical axis. In that application, I point out that the desired results can be obtained, provided certain relationships, which involve the thicknesses of the two negative meniscus components, the curvatures of the opposed surfaces of those components, and the length of the central air space between them, are kept within restricted limits. The relationships referred to are four ratios having a common denominator $\lambda$, which is defined as the geometrical distance along the optical axis between the convex vertices of the negative meniscus components and is thus equal to the sum of the overall thicknesses of the two components plus the length of the air space. In a lens giving the desired improved performance, the value of $\lambda$ lies between 0.5 F and 0.65 F, F being the equivalent focal length of the lens.

The four ratios mentioned may, for convenience, be designated $\tau_1$, $\tau_2$, $\rho_1$, and $\rho_2$. As defined in the co-pending application, the ratio $\tau_1$ is that of the total geometrical central thickness T' of the first (long conjugate side) negative meniscus component to $\lambda$, and the limits for the value of this ratio are 0.1 and 0.4, so that T' ranges between $0.1\lambda$ and $0.4\lambda$. The ratio $\tau_2$ is the corresponding ratio of the total geometrical central thickness T'' of the second negative meniscus component to $\lambda$ and the limits of the value $\tau_2$ are 0.1 and 0.325, so that T'' ranges between $0.1\lambda$ and $0.325\lambda$. The total central thickness of either negative meniscus component is to be understood as the total geometrical axial distance between the convex outer air surface of the component and the concave surface of the component forming a boundary of the central air space of the system. The total geometrical central thickness of such a component is, therefore, the sum of the geometrical axial thicknesses of the various elements and internal air lenses, if any, of which the component is made, and, if the component is a single element, its total geometrical central thickness is merely the axial thickness of the element.

The ratio $\rho_1$ is that of the radius $R_5$ of the concave air surface of the first negative meniscus component to $\lambda$ and the ratio $\rho_2$ is the corresponding ratio of the radius $R_6$ of the concave air surface of the second negative meniscus component to $\lambda$. The ratios $\rho_1$ and $\rho_2$ are considered as absolute values and always taken as positive quantities. The limits of the value of $\rho_1$ are 0.31 and 0.45, so that $R_5$ ranges between $0.31\lambda$ and $0.45\lambda$. The limits for the value of $\rho_2$ are 0.31 and 0.50, so that $R_6$ ranges between $0.31\lambda$ and $0.50\lambda$.

The present invention is directed to the provision of optical objectives in which the value of the distance $\lambda$ and the values of the ratios $\tau_1$, $\tau_2$, $\rho_1$, and $\rho_2$ lie within the limits specified in the co-pending application, so that the objectives are characterized by reduced oblique spherical aberration and reduced astigmatism at points far off-axis. In addition, the optical objectives of the present invention have an unusually perfected state of correction of axial spherical aberration, the residual aberration usually being called zonal spherical aberration in the art.

Objectives of the general class to which this invention relates and which are characterized by reduced zonal spherical aberration, have heretofore been developed, but all those objectives, with which I am familiar, fail to fulfill the conditions set forth in the co-pending application. In such prior objectives, the reduction in zonal spherical aberration has been obtained by the adoption of shallow curves or low lens powers or by the use of glass of a high index of refraction. The reduced zonal spherical aberration obtained in such objectives has thus been frequently accompanied by a sacrifice of off-axis definition, because too large a value of the Petzval curvature has necessarily been adopted, or by the toleration of an undesirably large amount of oblique spherical aberration.

I have found that lenses of the class, with which this invention is concerned, which have reduced spherical aberration and reduced off-axis astigmatism and are characterized additionally by reduced zonal spherical aberration, can be produced, provided that, in such lenses, the values of $\lambda$ and of the four ratios $\tau_1$, $\tau_2$, $\rho_1$, and $\rho_2$ lie within the limits specified in the co-pending application and provided also that certain other conditions are fulfilled. In the new lenses, it has proved possible to obtain an axial image of a high degree of purity and, at the same time, to secure, at points far off the optical axis, images free of marked astigmatism and oblique spherical aberration. It will be understood that such lenses also give improved performance at intermediate points and their outermost image points do not fall far short of perfection.

In order that the invention may be understood, it should be pointed out that the increasing use of fine grain photographic materials and color emulsions in indoor cine-photography and in other applications, as in cathode ray oscillograph recording or X-ray roentgenography, require ever faster lenses of adequate resolution. Lenses for such purposes must, therefore, have a speed increased to the point beyond which a tolerable definition can no longer be obtained. The degree of speed achieved will then depend on the degree to which the zonal spherical aberration and the oblique spherical aberration have been reduced.

In still other applications, such as night aerial photography, fast lenses of increased focal length are needed. In such uses, nominal lens speeds might be found satisfactory but linear resolution found inferior, because of the magnification of the image errors with an increase in focal length. Consequently, it is important, even for a given speed, that the spherical aberration be held within close limits. Finally, for lenses of large focal length, it becomes increasingly impractical to employ glasses of high index of refraction for reducing spherical aberration, not only because of the expense and manufacturing difficulties involved but also because of the accentuated absorption within the thick high index elements, which detracts directly from the rated speed. It is to be understood that, in all such applications, other aberrations, such as coma, distortion, color, and field curvature, must be held to customary tolerances in terms of linear resolution, regardless of the focal length, lens speed, or angular field covered.

In optical systems of limited angular coverage, as in standard photographic lenses for hand photography and for cine-photography or projection, it is possible to lessen the undesirable large refractions of the extreme rays by relying on the ratio of the overall barrel length to focal length for a given Petzval sum, "barrel length" being understood to mean the overall geometrical axial distance from the first lens vertex to the last lens vertex. Also, in long lens systems, negative elements may be used at low heights in the beam and this detracts least from the net positive power of the system. However, when large barrel lengths are employed in systems of large angular coverage, astigmatism and oblique spherical aberration can easily become excessive, unless definite compensating means are found to hold these aberrations within acceptable limits. Heretofore, this effort has been unfruitful for lenses of the type under consideration, with the result that they have been discarded and resort has been had to quite different basic lens forms, either not afflicted with such difficulties or having them to a less degree.

The reduction of zonal spherical aberration in objectives having values for the distance $\lambda$ and for the four ratios $\tau_1$, $\tau_2$, $\rho_1$, and $\rho_2$, lying within the prescribed limits, involves fulfilling certain conditions, one of which is a ratio involving the curvatures of the concave air surfaces of the negative meniscus components. The other conditions to be fulfilled involve relations between the radius of the convex outermost surface of the second meniscus component and the last radius of the system.

In most practical systems of the kind under consideration, the concave surfaces of the two negative meniscus components contribute nearly all of the compensating negative spherical aberration of the system. If this compensating burden falls too heavily upon one of the two surfaces, then it is evident that, at a given lens speed, the over-burdened surface will contribute too much over-correction to the final image, with the result that the zonal spherical aberration will be accentuated. For best results, I have found that the correction should be divided approximately equally between the two concave surfaces, and, optically, this places limits on the ratios of the radii of the two concave surfaces referred to. I have found that, when the ratio of $\rho_1$ to $\rho_2$, as above defined, lies between 0.75 and 0.95, the condition of approximate equality in the contributions of the concave surfaces of the negative meniscus components to negative spherical aberration is realized for systems having additional characteristics set forth below. As both ratios $\rho_1$ and $\rho_2$ have the same denominator $\lambda$, the relationship between the ratios may be expressed as the ratio of their numerators, that is, the ratio of $R_5$ to $R_6$, in which event, it is apparent that, to meet the stated requirement, $R_5$ should range from $0.75R_6$ to $0.95R_6$.

In lens systems of the kind with which the invention is concerned, the convex outermost surfaces of the two negative meniscus components and the two outermost surfaces of the system as a whole, that is, the first surface and the last surface, contribute the most important part of the positive spherical aberration of the system. It is evident, therefore, that, if the sum total of these positive aberrations is large, the negative compensating surfaces must contribute a large sum of negative spherical aberration with resultant accentuated zonal spherical aberration. Moreover, if the sum of the spherical aberrations is distributed approximately equally among the four surfaces and compensated by only two negative surfaces, it is also evident that the higher order over-compensation of the two surfaces will predominate and again the zonal spherical aberration will be accentuated. Ideally, the positive spherical aberration should be confined as much as possible to one or two of the four critical surfaces, in order that the higher of the aberrations may be dominated by the positive surface or surfaces, but this latter condition is incompatible with requirements as to lens speed, distortion correction, flatness of field, freedom from coma, and astigmatism. I have found, however, that for systems in which the value of $\lambda$ and of the four ratios $\tau_1$, $\tau_2$, $\rho_1$, and $\rho_2$ lie within the prescribed limits, zonal spherical aberration may be reduced, once the ratio of $\rho_1$ to $\rho_2$ has been kept within the assigned limits, by placing extra optical power upon the outermost convex surface of the second negative meniscus component. For this purpose, I transfer to that surface a portion of the power of the rear surface of the system or of the collective rear surfaces of individual elements following the second negative meniscus component. It is evident that such a transfer of power can easily be overdone and, in the extreme, would lead to the elimination of the last element or elements altogether, with the result that the system would have zonal aberration opposite in sign to that ordinarily encountered and would suffer decidedly from pronounced residuals of all other aberrations.

No similar considerations apply to the elements preceding the central air-space because, in the forward part of the system, an effort must be made to lessen the positive spherical aberration by small contributions from the individual surfaces. If any attempt is made toward accentuating the positive spherical aberration of the front half of the system, the convergence of that part of the system is too greatly emphasized, with the result that a large air-space is required and the power of the system as a whole reduced. If the lens speed is maintained by extension of stop and lens diameters despite the steep curves, the spherical aberration once again becomes excessive and the lens system is either useless or extremely difficult to manufacture.

I have found that, in lens systems of the kind discussed herein, that is, systems in which the values of $\lambda$ and the four ratios $\tau_1$, $\tau_2$, $\rho_1$, and $\rho_2$ lie within the prescribed limits, the zonal spherical aberration may be reduced, once the ratio of $\rho_1$ to $\rho_2$ has been kept within the limits above specified, by adopting favorable values for $\rho_3$, which is defined as the ratio of the radius $R_8$ of the outermost convex surface of the second negative meniscus to $\lambda$, and for $\rho_4$, which is defined as the ratio $R_{10}$ of the radius of the last surface of the system to $\lambda$, all values for these ratios being considered positive for the purpose of defining the ranges. Extensive calculations have indicated that there are two important relationships in addition to the ratio of $\rho_1$ to $\rho_2$ that isolate the conditions for reduced zonal aberration in the lenses under consideration. These conditions are:

Condition A $\rho_4 + 1.192\rho_3 - 2.542\rho_3\rho_4$ is less than 0.

Condition B $\rho_4$ is less than $5\rho_3$ is less than 5.000.

If $\rho_3$ and $\rho_4$ fulfill the relationships above set forth, the desired reduction in zonal spherical aberration will follow. It is to be understood that the fulfillment of Conditions A and B is sufficient but not necessary for obtaining reduced spherical aberration in lenses of the same general type as those under consideration but in which the values of $\lambda$ and of the four ratios $\tau_1$, $\tau_2$, $\rho_1$, and $\rho_2$ do not lie within the prescribed limits. For lenses in which the values of $\lambda$ and of the four ratios lie within the prescribed limits and in which the value of the ratio of $\rho_1$ to $\rho_2$ lies between 0.75 and 0.95, the fulfillment of Conditions A and B is necessary and sufficient for the reduction of zonal aberration.

Compliance with Condition A governs the degree of transfer of power from the last element of the system to the outermost convex surface of the second negative meniscus element, and also expresses the fact that lens systems with shallower curves for a given effective speed of the system as a whole will in general have no very pronounced zonal spherical aberration. Fulfillment of Condition B insures that the transfer of power will not be overdone and that the lens curves cannot become shallower than demanded by lens systems of favorable correction for all oblique aberrations. The two conditions must be taken together and, when both are fulfilled, isolate the favorable factors that govern reduced zonal aberration for a given lens speed.

Figure 2:
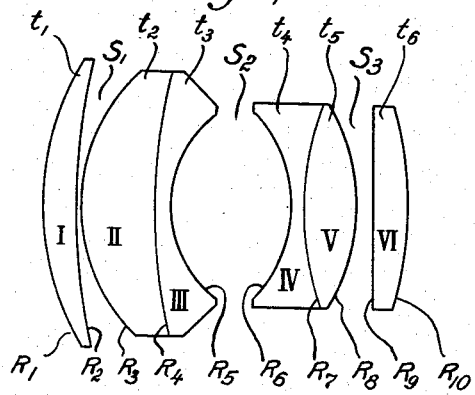
Figure 3:
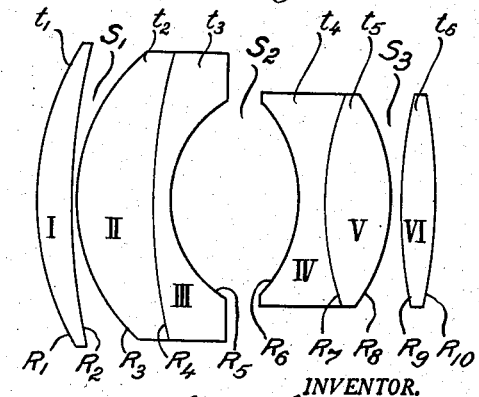

In the accompanying drawing, there are illustrated in Figs. 1, 2, and 3, three lens forms, for which the data are given in the following corresponding examples, designated Examples I, II, and III.

Example I

F = 1.000 (eff.)   f/2

| $\lambda$ | $\tau_1$ | $\tau_2$ | $\rho_1$ | $\rho_2$ | $\rho_3$ | $\rho_4$ | $\rho_1/\rho_2$ | Cond. A |
|---|---|---|---|---|---|---|---|---|
| 0.561 | 0.241 | 0.210 | 0.387 | 0.485 | 0.608 | 1.437 | 0.789 | −0.059 |

| Lens | Radii | Thickness | $N_D$ | $\nu$ |
|---|---|---|---|---|
| I | $R_1 = 0.536$ | $t_1 = 0.081$ | 1.657 | 51.2 |
|  | $R_2 = 1.324$ | $S_1 = 0.002$ |  |  |
| II | $R_3 = 0.324$ | $t_2 = 0.100$ | 1.657 | 51.2 |
| III | $R_4 = 1.295$ | $t_3 = 0.035$ | 1.649 | 33.8 |
|  | $R_5 = 0.217$ | $S_2 = 0.308$ |  |  |
| IV | $R_6 = -0.272$ | $t_4 = 0.018$ | 1.617 | 36.6 |
| V | $R_7 = 1.079$ | $t_5 = 0.100$ | 1.657 | 51.2 |
|  | $R_8 = -0.341$ | $S_3 = 0.002$ |  |  |
| VI | $R_9 = 6.473$ | $t_6 = 0.064$ | 1.670 | 47.2 |
|  | $R_{10} = -0.806$ |  |  |  |

The lens of Example I is characterized by reduced oblique spherical aberration and off-axis astigmatism, as indicated by the values of $\lambda$ and of the four ratios $\tau_1$, $\tau_2$, $\rho_1$, and $\rho_2$, and it also has reduced zonal spherical aberration, as indicated by its fulfillment of Conditions A and B, the value for Condition A being −0.059.

Example II

F = 1.000 (eff.)   f/1.9

| $\lambda$ | $\tau_1$ | $\tau_2$ | $\rho_1$ | $\rho_2$ | $\rho_3$ | $\rho_4$ | $\rho_1/\rho_2$ | Cond. A |
|---|---|---|---|---|---|---|---|---|
| 0.581 | 0.322 | 0.238 | 0.394 | 0.496 | 0.685 | 1.293 | 0.794 | −0.142 |

| Lens | Radii | Thickness | $N_D$ | $\nu$ |
|---|---|---|---|---|
| I | $R_1 = 0.5899$ | $t_1 = 0.0743$ | 1.670 | 47.2 |
|  | $R_2 = 1.8379$ | $S_1 = 0.0062$ |  |  |
| II | $R_3 = 0.3784$ | $t_2 = 0.1556$ | 1.657 | 51.2 |
| III | $R_4 = 1.2017$ | $t_3 = 0.0314$ | 1.689 | 30.9 |
|  | $R_5 = 0.2290$ | $S_2 = 0.2562$ |  |  |
| IV | $R_6 = -0.2883$ | $t_4 = 0.0312$ | 1.617 | 36.6 |
| V | $R_7 = 0.5681$ | $t_5 = 0.1075$ | 1.657 | 51.2 |
|  | $R_8 = -0.3976$ | $S_3 = 0.0375$ |  |  |
| VI | $R_9 = 2.4034$ | $t_6 = 0.0675$ | 1.670 | 47.2 |
|  | $R_{10} = -0.7509$ |  |  |  |

The lens of Example II has reduced oblique spherical aberration and off-axis astigmatism and also reduced zonal spherical aberration. In the lens of the example, the reduction in zonal spherical aberration has been achieved in part by a favorable distribution of the curves.

Example III

F = 1.000 (eff.)   f/1.9

| $\lambda$ | $\tau_1$ | $\tau_2$ | $\rho_1$ | $\rho_2$ | $\rho_3$ | $\rho_4$ | $\rho_1/\rho_2$ | Cond. A |
|---|---|---|---|---|---|---|---|---|
| 0.6182 | 0.3025 | 0.2330 | 0.371 | 0.466 | 0.616 | 2.086 | 0.796 | −0.446 |

| Lens | Radii | Thickness | $N_D$ | $\nu$ |
|---|---|---|---|---|
| I | $R_1 = 0.5899$ | $t_1 = 0.0743$ | 1.670 | 47.2 |
|  | $R_2 = 1.8379$ | $S_1 = 0.0062$ |  |  |
| II | $R_3 = 0.3784$ | $t_2 = 0.1556$ | 1.657 | 51.2 |
| III | $R_4 = 1.2017$ | $t_3 = 0.0314$ | 1.689 | 30.9 |
|  | $R_5 = 0.2299$ | $S_2 = 0.2562$ |  |  |
| IV | $R_6 = -0.2883$ | $t_4 = 0.0500$ | 1.617 | 36.6 |
| V | $R_7 = 0.6249$ | $t_5 = 0.1250$ | 1.657 | 51.2 |
|  | $R_8 = 0.3310$ | $S_3 = 0.0250$ |  |  |
| VI | $R_9 = 1.2895$ | $t_6 = 0.0625$ | 1.657 | 51.2 |
|  | $R_{10} = -1.2595$ |  |  |  |

The lens of Example III is similar to that of Example II, except that more power has been shifted to the second negative meniscus component at the expense of the rear element. The value of Condition A is, accordingly, more highly negative and the lens has negligible zonal spherical aberration.

Another lens embodying the principles of the invention is set forth in the following example and is disclosed in the co-pending application.

Example IV

F=1.000 (eff.)     f/2

| $\lambda$ | $r_1$ | $r_2$ | $\rho_1$ | $\rho_2$ | $\rho_3$ | $\rho_4$ | $\rho_1/\rho_2$ | Cond. A |
|---|---|---|---|---|---|---|---|---|
| 0.559 | 0.220 | 0.231 | 0.401 | 0.487 | 0.639 | 1.313 | 0.823 | −0.058 |

| Lens | Radii | Thickness | $N_D$ | $\nu$ |
|---|---|---|---|---|
| I | $R_1=0.493$ | $t_1=0.077$ | 1.620 | 60.3 |
|   | $R_2=1.271$ | $S_1=0.002$ |       |      |
| II | $R_3=0.332$ | $t_2=0.104$ | 1.670 | 47.2 |
| III | $R_4=2.158$ | $t_3=0.019$ | 1.649 | 33.8 |
|     | $R_5=0.224$ | $S_2=0.307$ |       |      |
| IV | $R_6=-0.272$ | $t_4=0.026$ | 1.617 | 36.6 |
| V  | $R_7=-6.473$ | $t_5=0.103$ | 1.670 | 47.2 |
|    | $R_8=-0.357$ | $S_3=0.002$ |       |      |
| VI | $R_9=6.350$ | $t_6=0.058$ | 1.620 | 60.3 |
|    | $R_{10}=-0.731$ |           |       |      |

In all lenses made in accordance with the invention, the negative meniscus components may be either single elements, or one may be a single element and the other compounded of two or more elements, or both may be compounded of two or more elements. The negative meniscus components may also include two or more elements of overall meniscus form, which have "broken contact" and, therefore, have an air lens between them. Preferably, any such air lens is of low optical power and has a central axial thickness less than about 0.05 of the equivalent focal length of the objective. If the negative meniscus components each consist of a single element, that element preferably has an index of refraction lying between 1.5 and 1.8.

The collective components exterior to each of the negative meniscus components in the lens of the invention may be either simple or compounded of positive and negative elements, or some may be simple and others compounded. The desired results may be obtained provided the elements exterior to the negative meniscus components have a net collective effect, even though they may contain air-spaced negative elements or negative components. When the external collective components consist of simple collective elements, those elements preferably have an index of refraction lying between 1.5 and 1.8.

I have found that if, in a lens of the invention, in which compounded meniscus components are employed, the difference in index at the second cemented surface, that is, the cemented surface of the second negative meniscus component, exceeds 0.03, the curvature of this interface becomes important in compensating for the residual abberations. Also, under such conditions, the reciprocal of the radius of the second cemented interface expressed in units of the equivalent focal length must lie between +2 and −2.

This application is a continuation-in-part of my co-pending application Serial No. 779,914, filed October 15, 1947, now abandoned, and is related to my co-pending applications Serial No. 738,059, filed March 29, 1947, now abandoned, and Serial No. 118,627, filed September 29, 1949.

I claim:
1. An optical objective made of glass components throughout and corrected for coma, field curvature, distortion, and chromatic aberration and having greatly reduced oblique spherical aberration and astigmatism at points far off-axis together with an unusually perfected state of correction of zonal spherical aberration, which comprises a pair of meniscus components each of net dispersive effect lying concave to each other at opposite ends of a central air space and a plurality of collective components disposed at opposite ends of the meniscus components, the length of the air space and the axial thicknesses of the meniscus components being such that the geometrical axial distance $\lambda$ between the outside convex vertices of the meniscus components lies between 0.5F and 0.65F, F being the equivalent focal length of the objective, the objective being further characterized in that

T′ ranges between $0.1\lambda$ and $0.4\lambda$

T″ ranges between $0.1\lambda$ and $0.325\lambda$ $R_6$ ranges between $0.31\lambda$ and $0.50\lambda$ $R_5$ ranges from $0.75R_6$ to $0.95R_6$, The value of the ratio $R_8/\lambda$ is less than 1.00, The value of the ratio $R_{10}/\lambda$ is less than 5.00 and less than 5 times the value of the ratio $R_8/\lambda$, and The value of the expression $$\frac{R_{10}}{\lambda}+1.192\frac{R_8}{\lambda}-2.542\frac{R_8}{\lambda}\cdot\frac{R_{10}}{\lambda}$$

is less than 0,

T′ being the thickness of the first (long conjugate side) meniscus component, T″ being the thickness of the second meniscus component, $R_5$ being the radius of the concave inner surface of the first meniscus component, $R_6$ being the radius of the concave inner surface of the second meniscus component, $R_8$ being the radius of the outermost convex surface of the second meniscus component, and $R_{10}$ being the radius of the last surface of the system, all values of the radii being considered to be of positive algebraic sign.

2. An optical objective as defined in claim 1, in which each of the negative meniscus components is compound.

3. An optical objective as defined in claim 1, in which each of the negative meniscus components is made up of a positive element and a negative element.

4. An optical objective as defined in claim 1, in which each of the collective components is a simple element.

5. An optical objective as defined in claim 1, in which each negative meniscus component consists of two elements cemented together and each collective component is a simple element.

6. An optical objective having numerical data substantially as follows:

F=1.000 (eff.)     f/2

| Lens | Radii | Thickness | $N_D$ | $\nu$ |
|---|---|---|---|---|
| I | $R_1=0.536$ | $t_1=0.081$ | 1.657 | 51.2 |
|   | $R_2=1.324$ | $S_1=0.002$ |       |      |
| II | $R_3=0.324$ | $t_2=0.100$ | 1.657 | 51.2 |
| III | $R_4=1.295$ | $t_3=0.035$ | 1.649 | 33.8 |
|     | $R_5=0.217$ | $S_2=0.308$ |       |      |
| IV | $R_6=-0.272$ | $t_4=0.018$ | 1.617 | 36.6 |
| V  | $R_7=1.079$ | $t_5=0.100$ | 1.657 | 51.2 |
|    | $R_8=-0.341$ | $S_3=0.002$ |       |      |
| VI | $R_9=6.473$ | $t_6=0.064$ | 1.670 | 47.2 |
|    | $R_{10}=-0.806$ |         |       |      | in which $R_1, R_2 \ldots$ represent the radii of curvature of the individual lens surfaces counting from the long conjugate side, $t_1, t_2 \ldots$ represent the axial thicknesses of the individual elements, and $S_1, S_2$ and $S_3$ represent the axial air separations between the components.

7. An optical objective having numerical data substantially as follows:

$F = 1.000$ (eff.)　　$f/1.9$

| Lens | Radii | Thickness | $N_D$ | $\nu$ |
|---|---|---|---|---|
| I | $R_1 = 0.5899$ | $t_1 = 0.0743$ | 1.670 | 47.2 |
|   | $R_2 = 1.8379$ | $S_1 = 0.0062$ | | |
| II | $R_3 = 0.3784$ | $t_2 = 0.1556$ | 1.657 | 51.2 |
| III | $R_4 = 1.2017$ | $t_3 = 0.0314$ | 1.689 | 30.9 |
|   | $R_5 = 0.2290$ | $S_2 = 0.2562$ | | |
| IV | $R_6 = -0.2883$ | $t_4 = 0.0312$ | 1.617 | 36.6 |
| V | $R_7 = 0.5681$ | $t_5 = 0.1075$ | 1.657 | 51.2 |
|   | $R_8 = -0.3976$ | $S_3 = 0.0375$ | | |
| VI | $R_9 = 2.4034$ | $t_6 = 0.0675$ | 1.670 | 47.2 |
|   | $R_{10} = -0.7509$ | | | | in which $R_1, R_2 \ldots$ represent the radii of curvature of the individual lens surfaces counting from the long conjugate side, $t_1, t_2 \ldots$ represent the axial thicknesses of the individual elements, and $S_1, S_2$ and $S_3$ represent the axial air separations between the components.

8. An optical objective having numerical data substantially as follows:

$F = 1.000$ (eff.)　　$f/1.9$

| Lens | Radii | Thickness | $N_D$ | $\nu$ |
|---|---|---|---|---|
| I | $R_1 = 0.5899$ | $t_1 = 0.0743$ | 1.670 | 47.2 |
|   | $R_2 = 1.8379$ | $S_1 = 0.0062$ | | |
| II | $R_3 = 0.3784$ | $t_2 = 0.1556$ | 1.657 | 51.2 |
| III | $R_4 = 1.2017$ | $t_3 = 0.0314$ | 1.689 | 30.9 |
|   | $R_5 = 0.2290$ | $S_2 = 0.2562$ | | |
| IV | $R_6 = -0.2883$ | $t_4 = 0.0500$ | 1.617 | 36.6 |
| V | $R_7 = 0.6249$ | $t_5 = 0.1250$ | 1.657 | 51.2 |
|   | $R_8 = -0.3810$ | $S_3 = 0.0250$ | | |
| VI | $R_9 = 1.2895$ | $t_6 = 0.0625$ | 1.657 | 51.2 |
|   | $R_{10} = -1.2895$ | | | | in which $R_1, R_2 \ldots$ represent the radii of curvature of the individual lens surfaces counting from the long conjugate side, $t_1, t_2 \ldots$ represent the axial thicknesses of the individual elements, and $S_1, S_2$ and $S_3$ represent the axial air separations between the components.

JAMES G. BAKER.

REFERENCES CITED

The following references are of record in the file of this patent:

UNITED STATES PATENTS

| Number | Name | Date |
|---|---|---|
| 583,336 | Rudolph | May 25, 1897 |
| 1,786,916 | Merte | Dec. 30, 1930 |
| 1,955,591 | Lee | Apr. 17, 1934 |
| 2,117,252 | Lee | May 10, 1938 |
| 2,130,760 | Warmisham | Sept. 20, 1938 |
| 2,349,893 | Warmisham et al. | May 30, 1944 |